US008377193B2

(12) United States Patent
Lortz et al.

(10) Patent No.: US 8,377,193 B2
(45) Date of Patent: Feb. 19, 2013

(54) DISPERSION COMPRISING HYDROPHOBIZED SILICON DIOXIDE PARTICLES

(75) Inventors: Wolfgang Lortz, Waechtersbach (DE);
Gabriele Perlet, Grosskrotzenburg (DE);
Uwe Diener, Grosskrotzenburg (DE);
Sascha Reitz, Hanau (DE)

(73) Assignee: Evonik Degussa GmbH, Essen (DE)

( * ) Notice: Subject to any disclaimer, the term of this patent is extended or adjusted under 35 U.S.C. 154(b) by 304 days.

(21) Appl. No.: 12/920,216

(22) PCT Filed: Mar. 5, 2009

(86) PCT No.: PCT/EP2009/052581
§ 371 (c)(1),
(2), (4) Date: Aug. 30, 2010

(87) PCT Pub. No.: WO2009/121680
PCT Pub. Date: Oct. 8, 2009

(65) Prior Publication Data
US 2011/0000397 A1 Jan. 6, 2011

(30) Foreign Application Priority Data
Apr. 2, 2008 (EP) .................... 08103321

(51) Int. Cl.
*C04B 14/04* (2006.01)
*C09K 17/02* (2006.01)
*B01F 3/12* (2006.01)
(52) U.S. Cl. .............. 106/481; 106/287.29; 516/34
(58) Field of Classification Search .......... 106/481, 106/297; 516/34
See application file for complete search history.

(56) References Cited

U.S. PATENT DOCUMENTS

| 4,430,369 A * | 2/1984 | Payne ................ 427/397.7 |
| 5,856,379 A | 1/1999 | Shiratsuchi et al. |
| 6,479,156 B1 * | 11/2002 | Schmidt et al. .......... 428/428 |
| 2007/0145327 A1 | 6/2007 | Lortz et al. |
| 2009/0120328 A1 | 5/2009 | Michael et al. |

FOREIGN PATENT DOCUMENTS

| DE | 103 16 661 | 11/2004 |
| DE | 10 2006 020 987 | 11/2007 |

* cited by examiner

*Primary Examiner* — Shuangyi Abu Ali
(74) *Attorney, Agent, or Firm* — Oblon, Spivak, McClelland, Maier & Neustadt, L.L.P.

(57) ABSTRACT

Aqueous dispersion which comprises hydrophobized silicon dioxide particles and in each case one or more dispersing additives, a basic composition, and which is free of color pigments, inactive fillers and binders, in which the hydrophobized silicon dioxide particles have a methanol wettability of 30 to 60 and are present in the dispersion with a proportion of 0.1 to 50% by weight,—the proportion of water is 30 to 90% by weight based on the dispersion,—the dispersing additive is at least one phosphate ester of an ethoxylated alcohol having 8 to 18 carbon atoms, the proportion of which is 3 to 25% by weight based on the proportion of the hydrophobized silicon dioxide particles,—the basic composition comprises or consists of one or more amines of the general formula $RNH_2$, $R_2NH$ and $R_3N$, where R is an alkyl group or a hydroxyl-substituted alkyl group having in each case 2 to 10 carbon atoms, and is present with a proportion of 5 to 30% by weight based on the proportion of hydrophobized silicon dioxide particles,—the dispersion further comprises one or more polyols having 2 to 15 carbon atoms, the proportion of which is 1 to 10% by weight based on the proportion of hydrophobized silicon dioxide particles,—the pH of the dispersion being 9 to 11.

15 Claims, 3 Drawing Sheets

DISPERSION COMPRISING HYDROPHOBIZED SILICON DIOXIDE PARTICLES

The invention relates to an aqueous dispersion which comprises hydrophobized silicon dioxide particles, and to the preparation and use thereof. The invention further relates to a formulation which comprises hydrophobized silicon dioxide particles, and to the preparation and use thereof.

Important factors in the preparation of dispersions are:
good wetting of the fillers and pigments during processing. This allows the dispersion times and the introduction of dispersion energy to be reduced;
often, a very low viscosity of the dispersions is desired;
after drying, a high shine should be achieved;
the settling tendency of the solid phase of the dispersion should be at a minimum, including in the course of prolonged storage, transport over large distances and under extreme climatic stress;
no flocculation should occur in the dispersion; this is of particular significance in the production of reproducible hues in the case of use of nowadays customary colour mixing machines;
the dispersion should be compatible with a multitude of additives.

In order to take account of these factors, dispersants are generally added to the dispersion. For this purpose, a multitude of water-soluble dispersants has already been proposed, for example dispersants based on inexpensive ionic structures such as polyphosphates (Ullmann's Encyclopedia of Industrial Chemistry, Sixth Edition, Point 3.2.6., 2002; Th. Staffel, Farbe & Lack 100, 1994) and polyacrylic acids (WO-A-02/14415, WO-A-01/60925, J. Schröder, Farbe & Lack 91, 1985, 11; R. Hildred, Farbe & Lack, 1990, 857-859) or amphiphilic structures, i.e. with defined hydrophobic and hydrophilic blocks, based on nonionic fatty alcohol ethoxylates or alkylphenol ethoxylates, or anionically modified derivatives thereof.

Nevertheless, only a few highly filled, low-viscosity, stable aqueous dispersions which comprise hydrophobized silicon dioxide particles are known to date. Highly filled dispersions are desired because this allows the transport costs to be lowered and because, when they are incorporated into highly filled coating dispersions, they are not to be diluted again with products having a high water content.

DE-A-10316661 discloses a highly filled, low-viscosity dispersion which contains 5 to 50% by weight of hydrophobized silicon dioxide particles, and a dispersant of the general formula $R^1\text{-COO}\text{---}(CH_2\text{---}CH(Ph)\text{-O})_a\text{---}(C_nH_{2n-x}R^2_x\text{---}O)_b\text{---}R^3$. However, this dispersion leads only to moderately long-lasting coatings in the application.

It is therefore an object of the invention to provide a low-viscosity dispersion with a high proportion of hydrophobized silicon dioxide particles, which has a high stability and, after processing to aqueous formulations, again builds up a significant structural viscosity.

The invention provides an aqueous dispersion which comprises hydrophobized silicon dioxide particles and in each case one or more dispersing additives, a basic composition, and which is free of colour pigments, inactive fillers and binders, characterized in that the hydrophobized silicon dioxide particles have a methanol wettability of 30 to 60, preferably 35 to 55, and are present in the dispersion with a proportion of 0.1 to 50% by weight, preferably 10 to 30% by weight, the proportion of water is 30 to 90% by weight, preferably 50 to 70% by weight, based in each case on the dispersion, the dispersing additive is at least one phosphate ester of an ethoxylated alcohol having 8 to 18 carbon atoms, the proportion of which is 3 to 25% by weight, preferably 6 to 20% by weight and more preferably 9 to 16% by weight, based in each case on the proportion of the hydrophobized silicon dioxide particles, the basic composition comprises or consists of one or more amines of the general formula $RNH_2$, $R_2NH$ and $R_3N$, where R is an alkyl group or a hydroxyl-substituted alkyl group having 2 to 10 carbon atoms, which may be substituted or unsubstituted, linear or branched, acyclic or cyclic, and is present with a proportion of 5 to 30% by weight, preferably 10 to 20% by weight and most preferably 12.5 to 17.5% by weight, based in each case on the proportion of hydrophobized silicon dioxide particles, the dispersion further comprises one or more polyols having 2 to 15 carbon atoms, the proportion of which is 1 to 10% by weight, preferably 3 to 7% by weight, based in each case on the proportion of hydrophobized silicon dioxide particles, the phosphate ester, the basic composition and the polyol being soluble in the aqueous phase of the dispersion and the pH of the dispersion being 9 to 11.

An aqueous dispersion shall be understood to mean a dispersion which contains more than 50% by weight of water, generally more than 70% by weight of water, based on the liquid phase of the dispersion.

It has been found that conditions regarding the degree of hydrophobicity of the hydrophobized silicon dioxide particles used in the inventive dispersion have to be observed. When the hydrophobicity of the silicon dioxide particles is too high or too low, this has adverse effects on the stability of the inventive dispersion. A suitable measure of the hydrophobicity is the methanol wettability.

In the determination of the methanol wettability, in each case 0.2 g (±0.005 g) of hydrophobic silicon dioxide particles is weighed into transparent centrifuge tubes. 8.0 ml of a methanol/water mixture containing one of 10, 20, 30, 40, 50, 60, 70 and 80% by volume of methanol are added to each weighed sample. The closed tubes are shaken for 30 seconds and then centrifuged at 2500 min$^{-1}$ for 5 minutes. The sediment volumes are read off, converted to percent and plotted graphically against the methanol content (% by volume). The turning point of the curve corresponds to the methanol wettability. The higher the methanol wettability, the greater the hydrophobicity of the silicon dioxide particles.

In the inventive dispersion, the methanol wettability is 30 to 60. Suitable commercially obtainable hydrophobized silicon dioxide particles which meet this condition are, for example, AEROSIL® R972, AEROSIL® R974, AEROSIL® R104, AEROSIL® R106 and AEROSIL® R9200, all from Evonik Degussa.

The hydrophobized silicon dioxide particles can preferably be obtained by hydrophobizing fumed silicon dioxide particles. Fumed particles are understood to mean those produced by flame hydrolysis or flame oxidation. Fumed silicon dioxide particles are described, for example, in Ullmann's Encyclopedia of Industrial Chemistry, Vol. A23, page 635, 5$^{th}$ Edition. These particles are generally present in the form of aggregated primary particles and have, on their surface, reactive sites which can react with a hydrophobizing agent. The hydrophobized silicon dioxide particles used for the inventive dispersion preferably have a BET surface area of 50 to 300 m$^2$/g, more preferably of 70 to 200 m$^2$/g and most preferably of 90 to 150 m$^2$/g.

In addition, it has been found to be advantageous when the hydrophobized silicon dioxide particles in the inventive dispersion have a mean particle size (median) of 200 nm or less. Particular preference is given to a range of 100 to 200 nm.

A further essential constituent of the inventive dispersion is at least one phosphate ester of an ethoxylated alcohol which contains 8 to 18 carbon atoms. The dispersion preferably comprises a mono-, di- and/or trisubstituted phosphate ester of an ethoxylated primary alcohol with one, two or three linear $C_{12}$-$C_{14}$ carbon chains.

In addition, the inventive dispersion comprises a basic composition which comprises or consists of one or more amines of the general formula $RNH_2$, $R_2NH$ and $R_3N$. The basic composition preferably consists of one or more amines of the general formula $RNH_2$, $R_2NH$ and $R_3N$. This amine is preferably a primary, secondary or tertiary amine or an amino alcohol having in each case 2 to 10 carbon atoms. Suitable compounds are, for example, monoethanolamine, diethanolamine, triethanolamine, monoisopropanolamine, diisopropanolamine, triisopropanolamine, N,N-dimethylisopropanolamine, 3-amino-1-propanol, 1-amino-2-propanol, 2-amino-2-methyl-1-propanol, 2-pyrrolidone, N-methyl-2-pyrrolidone, N-ethylpyrrolidone, N-vinyl-pyrrolidone, 1,3-dimethylimidazolidone and piperidine.

Particular preference is given to an inventive dispersion which comprises N,N-dimethylethanolamine ($Me_2N(CH_2)_2OH$).

A further essential constituent of the inventive dispersion is a polyol which contains 2 to 15 carbon atoms. The polyol is preferably selected from the group comprising ethylene glycol, propylene glycol, butylene glycol, diethylene glycol, triethylene glycol, tripropylene glycol, trimethylolpropane, pentaerythritol, neopentyl glycol, glycerol, diethylene glycol monomethyl ether, diethylene glycol monoethyl ether, diethylene glycol monobutyl ether, dipropylene glycol monoethyl ether, acetylene glycols such as 2,4,7,9-tetramethyldec-5-yne-4,7-diol, or acetylene glycol derivatives.

The inventive dispersion may preferably comprise tripropylene glycol, 2,4,7,9-tetramethyldec-5-yne-4,7-diol or a mixture of the two.

The inventive aqueous dispersion may further comprise N-methyl-2-pyrrolidone. The proportion of N-methyl-2-pyrrolidone is preferably 1 to 20% by weight based on the proportion of hydrophobized silicon dioxide particles.

In addition, an aqueous dispersion which comprises N,N-dimethylethanolamine and 1-methyl-2-pyrrolidone may be advantageous.

The inventive dispersion may further comprise one or more preferably silicone-free defoamers. The proportion thereof is preferably 0.5 to 5% by weight and more preferably 1 to 3% by weight, based in each case on the proportion of hydrophobized silicon dioxide particles.

A particularly advantageous inventive dispersion has been found to be one which
has a pH of 9 to 11 and
contains 10 to 30% by weight, based on the dispersion, of
  hydrophobic silicon dioxide particles
  with a methanol wettability of 40 to 50,
  with a BET surface area of 90 to 150 m$^2$/g,
9 to 16% by weight, based on the proportion of hydrophobized silicon dioxide particles, of a mono-, di- and/or trisubstituted phosphate ester of an ethoxylated primary alcohol having one, two or three linear $C_{12}$-$C_{14}$ carbon chains,
5 to 20% by weight, based on the proportion of hydrophobized silicon dioxide particles, of N,N-dimethylethanolamine,
10 to 20% by weight, based on the proportion of hydrophobized silicon dioxide particles, of 1-methyl-2-pyrrolidone,
3 to 7% by weight of tripropylene glycol and 0.5 to 1.5% by weight of 2,4,7,9-tetramethyldec-5-yne-4,7-diol, based in each case on the proportion of hydrophobized silicon dioxide particles,
1 to 3% by weight, based on the proportion of hydrophobized silicon dioxide particles, of one or more defoamers
and 40 to 70% by weight of water, based on the dispersion.

A suitable dispersion apparatus for preparing the inventive aqueous dispersion is any apparatus which is capable of enabling intensive wetting of the hydrophobic powder with the aqueous phase. In the coatings industry, it is common practice to use dissolvers for this purpose, the relatively simple construction of which enables a mode of production which is low in maintenance and easy to clean. According to the required viscosity or else filling level of the aqueous dispersion of hydrophobic fumed silica to be obtained, however, intensive dispersion or post-grinding is necessary. The post-grinding can be effected, for example, in stirred ball mills. However, intensive shearing with the aid of rotor/stator machines is sufficient in many cases. An appropriate combination of wetting and dispersing means is that of the rotor/stator machines from Ystral, which enable the powder to be sucked in and, after the closure of the powder intake orifice, to be dispersed with intensive shearing.

Especially in the case of rotor/stator machines, in which air can be sucked in and hence foam can be formed, it has been found to be advantageous to initially charge only a portion of the water required and to incorporate a portion of the hydrophobic silicon dioxide. From a particular amount of hydrophobic silicon dioxide, approx. 25% by weight based on the total amount of hydrophobic silicon dioxide to be incorporated, the defoaming action thereof is detectable. Only then are the proportions of water and hydrophobic silicon dioxide yet to be added and the further constituents of the dispersion added.

The invention further provides a formulation which comprises hydrophobized silicon dioxide particles, one or more binders, one or more dispersing additives and a basic composition, in which the hydrophobized silicon dioxide particles have a methanol wettability of 30 to 60, preferably 35 to 55, and are present in the formulation with a proportion of 0.05 to 5% by weight, the dispersing additive is at least one phosphate ester of an ethoxylated alcohol having 8 to 18 carbon atoms, the proportion of which is 3 to 25% by weight, preferably 6 to 20% by weight and more preferably 9 to 16% by weight, based in each case on the proportion of the hydrophobized silicon dioxide particles, the basic composition comprises or consists of one or more amines of the general formula $RNH_2$, $R_2NH$ and $R_3N$, where R is an alkyl group or a hydroxyl-substituted alkyl group having 2 to 10 carbon atoms, which may be substituted or unsubstituted, linear or branched, acyclic or cyclic, and is present with a proportion of 5 to 30% by weight, preferably 10 to 20% by weight and most preferably 12.5 to 17.5% by weight, based in each case on the proportion of hydrophobized silicon dioxide particles, the dispersion further comprises one or more polyols having 2 to 15 carbon atoms, the proportion of which is 1 to 10% by weight, preferably 3 to 7% by weight, based in each case on the proportion of hydrophobized silicon dioxide particles, and the pH of the formulation being less than 9, preferably 8 to 8.9.

Suitable binders may be the resins customary in paints and coatings technology, as described, for example, in "Lackharze, Chemie, Eigenschaften and Anwendungen [Coating resins, chemistry, properties and applications], Eds. D. Stoye, W. Freitag, Hanser Verlag, Munich, Vienna, 1996".

Examples include the polymers and copolymers of (meth) acrylic acid and esters thereof, optionally bearing further functional groups, with further olefinically unsaturated compounds, for example styrene, polyetherpolyols, polyesterpolyols, polycarbonatepolyols, polyurethanepolyols and epoxy resins, and also any mixtures of these polymers, and also fatty acid-modified "alkyd resins" prepared by polycondensation, as described in Ullmann, $3^{rd}$ Edition, Volume 11, page 334 ff.

In addition, the polymer components used may be organic compounds bearing hydroxyl groups, for example polyacrylate-, polyester-, polycaprolactone-, polyether-, polycarbonate- and polyurethanepolyols, and hydroxy-functional epoxy resins, and also any mixtures of these polymers. Especially aqueous or solvent-containing or solvent-free polyacrylate- and polyesterpolyols and any mixtures thereof are used.

Polyacrylatepolyols are copolymers of monomers, some of which have hydroxyl groups, with other olefinically unsaturated monomers, for example esters of (meth)acrylic acid, styrene, alpha-methylstyrene, vinyltoluene, vinyl esters, mono- and dialkyl maleates and fumarates, alpha-olefins and further unsaturated oligomers and polymers.

The inventive formulation may further comprise colour pigments and/or inactive fillers.

The colour pigments may be of organic or inorganic nature. Examples include barium sulphate, lead oxides, lead silicates, iron oxides, phthalocyanine complexes, titanium dioxides, zinc oxides and zinc sulphide.

The inventive formulation may further comprise inactive fillers. Inactive fillers are understood to mean fillers which are known to those skilled in the art and influence the rheological properties of the formulation only insignificantly, if at all. Examples include calcium carbonate, diatomaceous earth, mica, kaolin, chalk, quartz and talc.

Colour pigments and/or inactive fillers are typically present in proportions totalling 10 to 70% by weight, preferably 30 to 50% by weight, based on the total solids content of the formulation.

The total solids content of the formulation, which is composed of hydrophobized silicon dioxide particles, binders and any colour pigments and inactive fillers, is preferably 40 to 60% by weight based on the formulation.

The invention further provides a process for preparing the formulation, in which the inventive aqueous dispersion is used.

The invention further provides for the use of the inventive aqueous dispersion or of the inventive formulation as an additive to waterborne surfacers in the automobile industry, as a coating constituent in can- and coil-coating processes, as an additive in water-based UV-curable formulations, for example for wood protection, and as a constituent of coating protection films.

EXAMPLES

Example 1

According to Invention 6.36 kg of Hydropalat® 7003 from Cognis, 1.27 kg of dimethylethanolamine (DMEA), 0.19 kg of BYK® 011 from Byk Chemie, 0.19 kg of Surfynol® 104 from Air Products, 1.91 kg of 1-methyl-2-pyrrolidone and 0.63 kg of tripropylene glycol were introduced with stirring into 21.19 kg of water.

The mixing was followed by the commencement of the intake of the hydrophobized silicon dioxide particles by suction with the aid of a Conti TDS 3 rotor-stator machine. After approx. 30 minutes, 12.80 kg of Aerosil® R972 from Evonik Degussa had been sucked in. Shearing was now continued for another 30 minutes, followed by dilution with 16.15 kg of demineralized water.

A dispersion with a content of hydrophobized silicon dioxide particles of 21% by weight was obtained. The pH of the dispersion is 10. This was adjusted to values down to 4 with addition of hydrochloric acid (1 M).

This dispersion is D1.

Example 2

According to Invention

A jacketed dispersing vessel is initially charged with 312.5 g of demineralized water, 100.0 g of Hydropalat® 7003, 6.0 g of DMEA, 3.0 g of BYK® 011, 3.0 g of Surfynol® 104 E, 30.0 g of 1-methyl-2-pyrrolidone and 10.0 g of tripropylene glycol, which were mixed with the aid of a Dispermat® laboratory dissolver from VMA-Getzmann GmbH (toothed disc of diameter 70 mm) at 200 revolutions per minute. Aerosil® R972 was then added in portions and dispersed at 2400 revolutions per minute. After approx. 80 g of Aerosil® R972, further Aerosil® R972 is added in alternation with further water (total of 339.5 g of water). At 170 g of Aerosil® R972, the entire amount of water had been added. Then a further 30 g of Aerosil® R972 and 6 g of DMEA are incorporated in alternation into the dispersion. In total, 200 g of Aerosil® R972 were incorporated (20 percent dispersion).

Subsequently, dispersion is continued with the dissolver at 2400 revolutions per minute for a further 15 min. In order to achieve good dispersion of the Aerosil, there is finally dispersion at 7000 revolutions per minute with the aid of an Ultra Turrax (rotor/stator dispersion unit of the Ultra-Turrax T50 type from Ika-Werke with the S50N-G45G dispersion tool) for 30 min. In the course of this, the jacketed dispersing vessel is cooled with water, such that the temperature is approx. 30° C.

The pH of the dispersion is 10.2, the viscosity 82 mPas at $10\ s^{-1}$ and 72 mPas at $100\ s^{-1}$ (all viscosity values reported in the examples are based on a temperature of 23° C.).

Example 3

According to Invention

A jacketed dispersing vessel is initially charged with 312.5 g of demineralized water, 100.0 g of Hydropalat® 7003, 6.0 g of DMEA, 3.0 g of BYK® 011, 3.0 g of Surfynol® 104 E, 30.0 g of 1-methyl-2-pyrrolidone and 10.0 g of tripropylene glycol, which are mixed with the aid of a Dispermat® laboratory dissolver from VMA-Getzmann GmbH (toothed disc of diameter 70 mm) at 200 revolutions per minute. Aerosil® R974 was then added in portions and dispersed at 2400 revolutions per minute. After approx. 70 g of Aerosil® R974, further Aerosil® R974 is added in alternation with further water (total of 339.5 g of water). At 170 g of Aerosil® R974, the entire amount of water had been added. Then a further 30 g of Aerosil® R974 and 6 g of DMEA are incorporated in alternation into the dispersion. Subsequently, dispersion is continued with the dissolver at 2400 revolutions per minute for a further 15 min. In order to achieve good dispersion of the Aerosil, there is finally dispersion at 7000 revolutions per minute with the aid of an Ultra Turrax (rotor/stator dispersion unit of the Ultra-Turrax T50 type from Ika-Werke with the S50N-G45G dispersion tool) for 30 min. In the course of this, the jacketed dispersing vessel is cooled with water, such that the temperature is approx. 30° C.

The pH of the dispersion is 10.1, the viscosity 1036 mPas at $10\ s^{-1}$ and 390 mPas at $100\ s^{-1}$.

Example 4

Comparative

A jacketed dispersing vessel is initially charged with 312.5 g of demineralized water, 100.0 g of Hydropalat® 7003, 6.0 g of DMEA, 3.0 g of BYK® 011, 3.0 g of Surfynol® 104 E, 30.0 g of 1-methyl-2-pyrrolidone and 10.0 g of tripropylene glycol, which are mixed with the aid of a Dispermat® laboratory dissolver from VMA-Getzmann GmbH (toothed disc of diameter 70 mm) at 200 revolutions per minute. Aerosil® R202 was then added in portions and dispersed at 2400 revolutions per minute. The powder is wetted very poorly and is dispersed in only poorly. After only 44 g (9% by weight), the dispersion became very viscous and no further Aerosil® R202 could be incorporated.

Example 5

Comparative

A jacketed dispersing vessel is initially charged with 312.5 g of demineralized water, 6.0 g of DMEA, 3.0 g of BYK® 011, 3.0 g of Surfynol® 104 E, 30.0 g of 1-methyl-2-pyrrolidone and 10.0 g of tripropylene glycol, which are mixed with the aid of a Dispermat® laboratory dissolver from VMA-Getzmann GmbH (toothed disc of diameter 70 mm) at 200 revolutions per minute. Aerosil® R972 was then added in portions and dispersed at 2400 revolutions per minute. The powder is wetted very poorly and is dispersed in only poorly. After only 40 g (10% by weight), the dispersion became very viscous.

Even the addition of further water (104 g) did not bring any significant improvement; only a further 6 g of Aerosil® R972 could be dispersed in. Further addition of 2.8 g of DMEA did not bring any improvement either.

Example 6

Comparative

A jacketed dispersing vessel is initially charged with 312.5 g of demineralized water, 100.0 g of Hydropalat® 7003, 6.0 g of DMEA, 3.0 g of BYK® 011, 3.0 g of Surfynol® 104 E and 30.0 g of 1-methyl-2-pyrrolidone, which are mixed with the aid of a Dispermat® laboratory dissolver from VMA-Getzmann GmbH (toothed disc of diameter 70 mm) at 200 revolutions per minute. Aerosil® R972 was then added in portions and dispersed at 2400 revolutions per minute. After approx. 80 g of Aerosil® R972, further Aerosil® R972 is added in alternation with further water (total of 339.5 g of water). At 160 g of Aerosil® R972, the entire amount of water had been added. Then a further 40 g of Aerosil® R972 and 6 g of DMEA are incorporated in alternation into the dispersion. In total, 200 g of Aerosil® R972 were incorporated (20% dispersion).

Subsequently, dispersion is continued with the dissolver at 2400 revolutions per minute for a further 15 min. In order to achieve good dispersion of the Aerosil, there is finally dispersion at 7000 revolutions per minute with the aid of an Ultra Turrax (rotor/stator dispersion unit of the Ultra-Turrax T50 type from Ika-Werke with the S50N-G45G dispersion tool)

for 30 min. In the course of this, the jacketed dispersing vessel is cooled with water, such that the temperature is approx. 30° C. The pH of the dispersion is 10.1, the viscosity 69 mPas at 10 s$^{-1}$ and 57 mPas at 100 s$^{-1}$.

Even by treatment with ultrasound, the dispersion is difficult to deaerate and is therefore only of limited suitability for applications in the paints and coatings sector.

Example 7

Comparative 100 g of Aerosil® R972 are incorporated by means of a dissolver at a setting of approx. 2500 rpm in portions into 192.5 g of demineralized water, 88 g of a mixture of the dispersant $C_{18}H_{37}$-COO—$(C_2H_4O)_{100}$H and of the amine oxide-containing maleic anhydride copolymer from Example 1, EP-A-1026178, in a mixing ratio of 85:15, as a 40 percent solution in water, and 7.5 g of Tego Foamex® 810, Degussa AG. A total of 1.79 g of 90% 2-amino-2-methyl-1-propanol solution are used to keep the pH at 10. After the remaining 110.21 g of demineralized water have been added, the mixture is homogenized further at 3000 rpm for 15 minutes. The actual dispersion is subsequently effected with the aid of an Ultra Turrax at 7000 rpm for 30 minutes.

$d_{50(V)}$ is 193 nm; the viscosity is 310 mPas at 10 s$^{-1}$, and 275 mPas at 100 s$^{-1}$.

Table 1 shows the composition and properties of the dispersions of Examples 1 to 7.

Inventive Examples 1 to 3 lead to dispersions with low viscosity, which increases only insignificantly even in the course of prolonged storage. Table 2 reproduces the values of the viscosity (in mPas) of the dispersion prepared in Example 1 as a function of the shear rate (in s$^{-1}$), immediately after the preparation of the dispersion, after 1 month of storage and after 6 months of storage.

The mean particle diameter $d_{50}$ (median) of the hydrophobized silicon dioxide particles behaves analogously. It is 156 nm immediately after preparation, 174 nm after 1 month of storage and 194 nm after 6 months of storage.

Figure 1:
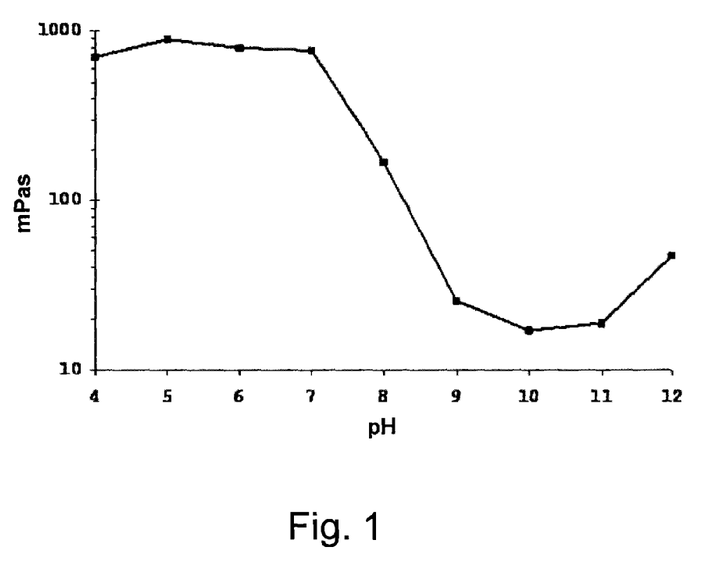
FIG. 1 is a graph showing the viscosity (in mPas) of an exemplary dispersion as a function of the pH.

FIG. 1 shows the viscosity (in mPas) as a function of the pH. In the range from 9 to 11, the dispersion exhibits a particularly low viscosity. At pH values less than 9, the viscosity rises again. This structural viscosity leads to an increase in the stability of a dispersion which, for example, also comprises fillers and/or colour pigments, since it greatly reduces the settling thereof.

TABLE 1

Composition and properties of the dispersions

| | | According to invention | | | Comparative | | | |
|---|---|---|---|---|---|---|---|---|
| | | 1 | 2 | 3 | 4 | 5 | 6 | 7 |
| AEROSIL ® | | R 972 | R 972 | R974 | R202 | R972 | R972 | R972 |
| BET surface area | m$^2$/g | 110 | 110 | 170 | 100 | 110 | 110 | 110 |
| Methanol wettability | g | 45 | 45 | 45 | 75 | 45 | 45 | 45 |
| | | 12800 | 200.0 | 200.0 | 44.0 | 40.0 | 200.0 | 100.0 |
| Demineralized water | g | 37340 | 652.0 | 652.0 | 312.5 | 312.5 | 652.0 | 355.7 |
| Hydropalat ® 7003 | g | 6360 | 100.0 | 100.0 | 100.0 | — | 100.0 | — |
| DMEA | g | 1270 | 12.0 | 6.0 | 6.0 | 6.0 | 12.0 | 1.61 |
| tripropylene glycol | g | 630 | 10.0 | 10.0 | 10.0 | 10.0 | — | — |
| Surfynol ® 104 E | g | 190 | 3.0 | 3.0 | 3.0 | 3.0 | 3.0 | — |
| BYK ® 011 | g | 190 | 3.0 | 3.0 | 3.0 | 3.0 | 3.0 | — |
| Nmethyl2pyrrolidone | g | 1910 | 30.0 | 30.0 | 30.0 | 30.0 | 30.0 | — |
| 85:15 $C_{18}H_{37}$COO—$(C_2H_4O)_{100}$ H/MA copolymer* | g | — | — | — | — | — | — | 35.20 |
| Tego Foamex ® 810 | g | — | — | — | — | — | — | 7.5 |
| pH | | 10 | 10.2 | — | n.d.** | n.d. | 10.1 | 10 |
| Viscosity 10 s$^{-1}$ | mPas | 70 | 82 | 1036 | n.d. | n.d. | 69 | 310 |
| Viscosity 100 s$^{-1}$ | mPas | 60 | 72 | 390 | n.d. | n.d. | 57 | 272 |
| Mean particle diameter*** | | | | | | | | |
| Median | μm | 0.096 | 0.224 | n.d. | — | — | 0.562 | — |
| Mean | μm | 0.105 | 0.261 | n.d. | — | — | 38.12 | — |

*from Example 1, EPA1026178, containing amine oxide;
**n.d. = not determined;
***determined with Horiba LA 910

TABLE 2

Viscosity of the dispersion from Example 1 as a function of shear rate and storage

| After preparation | | 1 month of storage | | 6 months of storage | |
|---|---|---|---|---|---|
| Shear rate [1/s] | Viscosity [mPa · s] | Schear rate [1/s] | Viscosity [mPa · s] | Schear rate [1/s] | Viscosity [mPa · s] |
| 0.1 | 80.06 | 0.1 | 128.4 | 0.1 | 166.2 |
| 0.1374 | 79.93 | 0.1374 | 131.7 | 0.1374 | 164.7 |
| 0.2593 | 85.82 | 0.2593 | 129.8 | 0.2593 | 162 |
| 0.3562 | 83.48 | 0.3562 | 127.7 | 0.3562 | 161.2 |
| 0.4894 | 81.39 | 0.4894 | 128.3 | 0.4894 | 158.7 |
| 0.6723 | 79.27 | 0.6723 | 125.7 | 0.6723 | 156.3 |
| 0.9237 | 76.97 | 0.9237 | 124.7 | 0.9237 | 154.2 |
| 1.269 | 75.26 | 1.269 | 122.6 | 1.269 | 151.5 |
| 1.743 | 74.33 | 1.743 | 120 | 1.743 | 148.2 |
| 2.395 | 72.86 | 2.395 | 117.5 | 2.395 | 144.6 |
| 3.29 | 71.39 | 3.29 | 114.7 | 3.29 | 140.6 |
| 11.72 | 69.91 | 11.72 | 111.6 | 11.72 | 136.2 |

TABLE 2-continued

Viscosity of the dispersion from Example 1 as a function of shear rate and storage

| After preparation | | 1 month of storage | | 6 months of storage | |
|---|---|---|---|---|---|
| Shear rate [1/s] | Viscosity [mPa·s] | Schear rate [1/s] | Viscosity [mPa·s] | Schear rate [1/s] | Viscosity [mPa·s] |
| 16.1 | 68.25 | 16.1 | 108.2 | 16.1 | 131.8 |
| 22.12 | 66.54 | 22.12 | 104.8 | 22.12 | 127.5 |
| 30.39 | 64.72 | 30.39 | 101.4 | 30.39 | 123.4 |
| 41.75 | 62.83 | 41.75 | 98.29 | 41.75 | 120.2 |
| 57.36 | 60.96 | 57.36 | 95.47 | 57.36 | 117.7 |
| 108.3 | 59.24 | 108.3 | 93.23 | 108.3 | 116.4 |
| 148.7 | 57.63 | 148.7 | 91.71 | 148.7 | 116.4 |
| 204.3 | 56.27 | 204.3 | 90.96 | 204.3 | 117.5 |
| 280.7 | 55.2 | 280.7 | 90.84 | 280.7 | 119.1 |
| 385.7 | 54.42 | 385.7 | 90.98 | 385.7 | 120.2 |
| 529.9 | 53.88 | 529.8 | 90.9 | 529.9 | 119.9 |
| 727.9 | 53.35 | 727.9 | 90.04 | 727.9 | 117.7 |
| 1000 | 52.79 | 1000 | 88.24 | 1000 | 113.8 |

Comparative Example 4 shows the influence of the methanol wettability of the hydrophobized silicon dioxide particles used. In Comparative Example 4, Aerosil® R202 with a methanol wettability of 75 is used, compared to Aerosil® R972 in Inventive Examples 1 and 2. Aerosil® R972 and Aerosil® R974 have comparable BET surface areas. Nevertheless, only small proportions can be incorporated.

In contrast to this, Inventive Example 3 shows that Aerosil® R974 with a higher BET surface area than Aerosil® R972 but with a comparable methanol wettability can also be incorporated in high proportions.

Comparative Example 5 shows the influence of the phosphate ester on the properties of the inventive dispersion. In this case, the hydrophobized silicon dioxide particles are wetted very poorly and the result is high-viscosity dispersions with a low filler content.

Comparative Example 6 shows the influence of the polyol on the properties of the inventive dispersion. Without a sufficient amount of polyol, sufficient foaming of the dispersion is not ensured. In the particle size determination, fractions with a high diameter are determined.

Comparative Example 7 is taken from DE-A-10316661 (Example 1 there). Table 1 shows that the viscosity of this dispersion is about four times higher than the viscosity of the inventive dispersion from Examples 1 and 2.

The application of a formulation comprising binders and colour pigments and if appropriate also inactive fillers is simplified considerably, since there is no runoff of the dispersion after application. Since a low viscosity is attained under shear, i.e. in the course of processing, the formulation can be processed very efficiently by spraying or else dipping. Especially in the case of dipping, a low viscosity is needed also to flow into ultrasmall cavities and gaps.

Examples of formulations comprising binders, colour pigments and inactive fillers are listed below.

TABLE 3

Grinding formulations A [all in g]

| | AI | AII | AIII |
|---|---|---|---|
| AEROSIL ® R972 | — | 0.33 | 1.00 |
| Bayhydrol ® D270 | 3.76 | 3.76 | 3.76 |
| Water | 8.28 | 8.28 | 8.28 |
| DMEA 10% in water | 0.53 | 0.53 | 0.53 |
| Surfynol ® 104E | 0.48 | 0.48 | 0.48 |
| BYK ® 011 | 0.89 | 0.89 | 0.89 |
| Tronox ® R-FD-I | 9.64 | 9.64 | 9.64 |
| Bayferrox ® 303T | 0.11 | 0.11 | 0.11 |
| Blanc fixe micro | 9.7 | 9.7 | 9.7 |
| talc, IT extra | 2.37 | 2.37 | 2.37 |
| Sum | 35.76 | 36.09 | 36.76 |

Bayhydrol ® D 270, water-dilutable polyester resin from Bayer AG;
Tronox ® R-FD-I, titanium dioxide from Kerr McGee Pigments GmbH & Co.KG),
Bayferrox ® 303 T, iron oxide black, Bayer AG;
Blanc fixe Micro, barium sulphate, Sachtleben GmbH; Micro
Talc IT Extra, talc, Norwegian Talc;
BYK ® 011, silicone-free defoamer, from Byk Chemie;
Surfynol ® 104E, 2,4,7,9-tetramethyldec-5-yne-4,7-diol, from Air Products

TABLE 4

Additive composition B (all in g)

| Hydropalat 7003 | 60.25 |
|---|---|
| N-methylpyrrolidone | 18.07 |
| DMEA | 12.05 |
| tripropylene glycol | 6.01 |
| BYK 011 | 1.81 |
| Surfynol E104 | 1.81 |
| Sum | 100 |

TABLE 5

Resins C and D (all in g)

| | C | D |
|---|---|---|
| Bayhydrol D270 | 6.76 | 7.86 |
| Bayhytherm 3146* | 32.51 | 37.80 |
| Bayhytherm VP LS 2153 | 37.36 | 43.45 |
| Cymel 327* | 7.65 | 8.90 |
| BYK 346* | 0.88 | 1.02 |
| DMEA 10% in water | 2.95 | 0.98 |
| water | 11.90 | — |
| Sum | 100 | 100 |

*Bayhytherm 3146 aliphatic, self-crosslinking urethane resin, Bayer AG;
Cymel ® 327, melamine resin, Dyno Cytec;
Byk ® 346, polyether-modified dimethylpolysiloxane solution

TABLE 6

Formulation based on resin C

|  |  | Comparative | | | | | According to invention | |
|---|---|---|---|---|---|---|---|---|
|  |  | C0 | C1 | C2 | C3 | C4 | C5 | C6 |
| D1 | g | — | — | — |  |  | 1.62 | 4.90 |
| AI | g | 35.76 | — | — |  |  | 35.76 | 35.76 |
| AII | g | — | 36.09 | — |  |  | — | — |
| AIII | g | — | — | 36.76 |  |  | — | — |
| Borchi Gel PW 25 * | g |  |  |  | 0.33 | 1.00 |  |  |
| B | g | 0.78 | 0.78 | 0.78 | 0.78 | 0.78 | 0.64 | — |
| Resin | g | 57.48 | 57.48 | 57.48 | 57.48 | 57.48 | 57.48 | 57.48 |
| Water | g | 5.97 | 5.64 | 4.97 | 5.64 | 4.97 | 4.49 | 1.86 |
| Sum | g | 100.00 | 100.00 | 100.00 | 100.00 | 100.00 | 100.00 | 100.00 |
| Solids | % by wt. | 49 | 49 | 49 | 49 | 49 | 49 | 49 |
| Hydrophobic SiO$_2$ | % by wt. | 0 | 0.33 | 1 | 0.33 | 1 | 0.33 | 1 |

Borchi ® Gel PW 25, from Borchers; structurally viscous thickener for adjusting the viscosity in the low and moderate shear segment;

TABLE 7

Formulation based on resin D

|  |  | Comparative | | | According to invention | |
|---|---|---|---|---|---|---|
|  |  | D0 | D1 | D2 | D3 | D4 |
| D1 | g | — |  |  | 4.9 | 9.8 |
| AI | g | 35.76 |  |  | 35.76 | 35.76 |
| AII | g |  |  |  |  |  |
| AIII | g |  | 36.76 |  |  |  |
| Borchi Gel PW 25 | g |  |  | 1 |  |  |
| B | g | 0.81 | 0.81 | 0.81 |  |  |
| Resin | g | 59.34 | 59.34 | 59.34 | 59.34 | 59.34 |
| Water | g | 4.09 | 3.09 | 3.09 |  |  |
| Sum | g | 100.00 | 100.00 | 100.00 | 100.00 | 104.9 |
| Solids | % by wt. | 54 | 55 | 55 | 55 | 53 |
| Hydrophobic SiO$_2$ | % by wt. | 0 | 1 | 1 | 1 | 2 |

Preparation and Testing of the Formulations (Coating Materials)

Predispersion: Mix millbase with dissolver for 5 min

Dispersion: Disperse millbase with Dispermat SL 603, 100 ml of 1 mm glass beads, at 3000 rpm, until grindometer <10 μm.

Letdown: The millbase is initially charged and the letdown mixture, additive mixture and water are added with stirring. Homogenize with dissolver for 5 min.

Viscosity of the coating materials:

Coating materials: Flow curves and yield tests

Flow curve: Preliminary shear=50 s$^{-1}$ (30 s)

Rest (600 s)

Measurement=0.1 s$^{-1}$ to 500 s$^{-1}$ (150 s)

Yield test: 120 s at 500 s$^{-1}$

300 s at 0.5 s$^{-1}$

Application: 18 mm/s with Erichsen automatic applicator and runoff blade on glass plates. Glass plates were placed vertically for a period of 3 min, then the runoff was assessed.

Settling behaviour: The samples were stored at 20° C. and 40° C. for four weeks and then the sediment height was measured with a ruler. The percentage ratio between sediment and supernatant phase was calculated therefrom and reported as the result.

Results

TABLE 8

Formulation based on resin C

|  | Comparative | | | | | According to invention | |
|---|---|---|---|---|---|---|---|
|  | C0 | C1 | C2 | C3 | C4 | C5 | C6 |
| pH | 8.64 | 8.69 | 8.61 | 8.64 | 8.68 | 8.68 | 8.64 |
| Flow time * | 17 | 20 | 26 | 120 | 20 | 20 | 22 |

* DIN 4 cup in s

TABLE 9

Formulation based on resin D

|  | Comparative | | | According to invention | |
|---|---|---|---|---|---|
|  | D0 | D1 | D2 | D3 | D4 |
| pH | 8.29 | 8.24 | 8.27 | 8.26 | 8.47 |

Settling behaviour: Here, the supernatant phase is reported as a percentage relative to the total fill level of the coating material; a small value means a better floating behaviour or antisettling behaviour.

TABLE 10

Settling behaviour, formulation based on resin C

|  | Comparative | | | | | According to invention | |
|---|---|---|---|---|---|---|---|
|  | C0 | C1 | C2 | C3 | C4 | C5 | C6 |
| At 20° C. | 66 | 53 | 34 | 58 | 29 | 56 | 49 |
| At 40° C. | 68 | 56 | 39 | 64 | 54 | 62 | 40 |

TABLE 11

Settling behaviour, formulation based on resin D

| | Comparative | | According to invention | |
|---|---|---|---|---|
| | D0 | D1 | D2 | D3 | D4 |
| At 20° C. | 23 | 5 | 5 | 21 | 1 |
| At 40° C. | 35 | 5 | 32 | 23 | 1 |

Values for TABLES 10 and 11 in %

Runoff behaviour: The run limit at which no runs extend down to the next thickest strip was assessed.

TABLE 12

Maximum layer thickness in μm

| | | Comparative | | According to invention |
|---|---|---|---|---|
| | | C0 | C2 | C4 | C6 |
| Maximum layer thickness | μm | 100 | 125 | 225 | 175 |

Figure 2A:
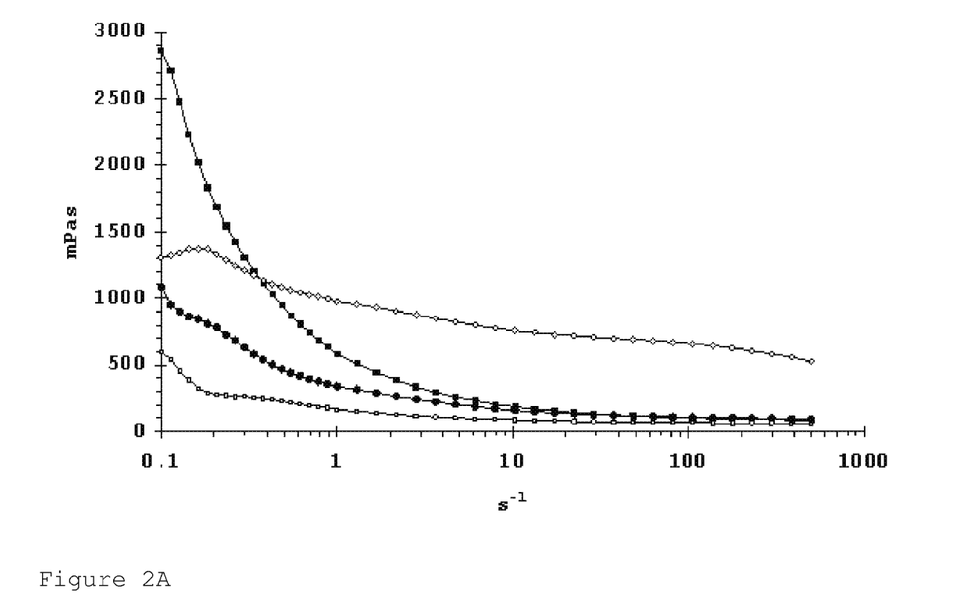
FIGS. 2A and 2B are graphs showing flow curves of coating materials based on resins C (□=coating material C0, •=coating material C2, ◇=coating material C4, ■=coating material C6)
Figure 2B:
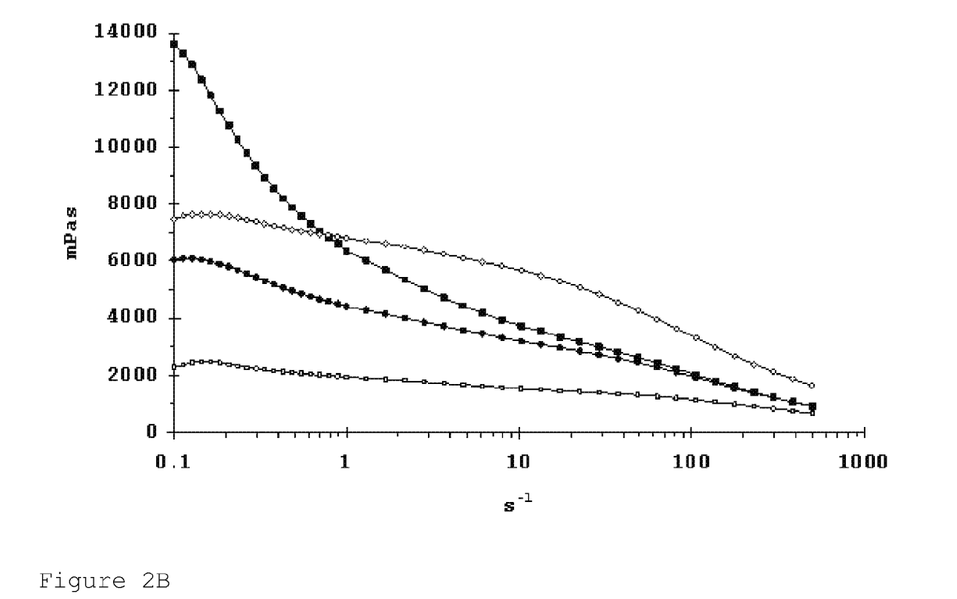
Figure 3A:
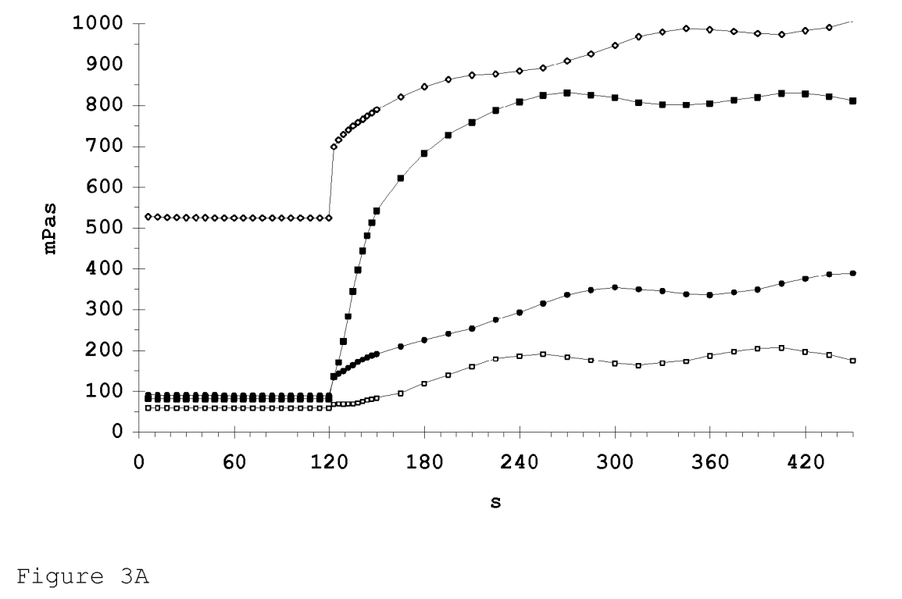
FIGS. 3A and 3B are graphs showing yield curves of coating materials based on resins D (□=coating material D0, •=coating material D1, ◇=coating material D2, ■=coating material D3).
Figure 3B:
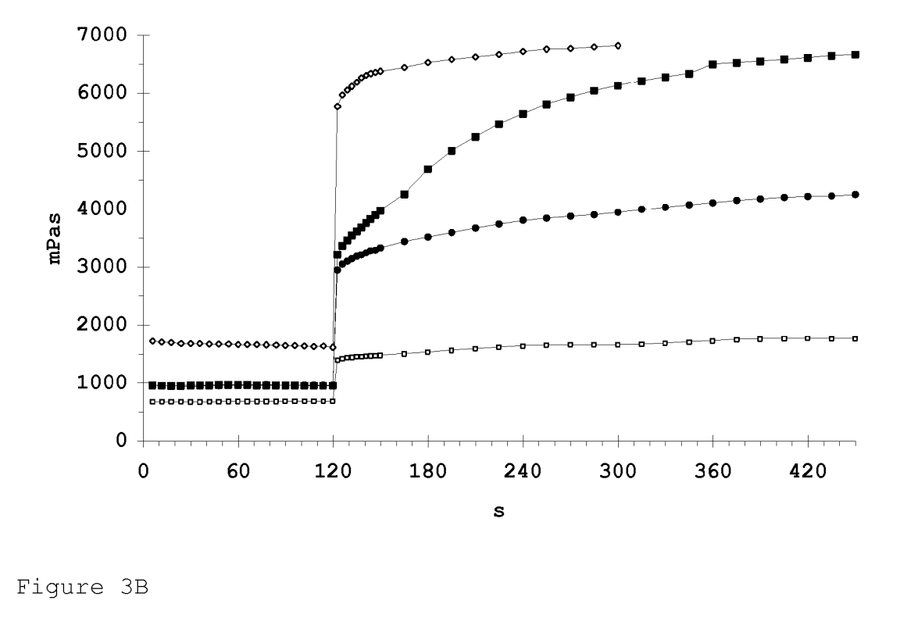

FIGS. 2 and 3 show the flow and yield curves of formulations (coating materials) based on resins C and D.

For FIG. 2A and FIG. 2B:

□=coating material C0, ●=coating material C2, ◇=coating material C4, ■=coating material C6.

For FIG. 3A and FIG. 3B:

□=coating material D0, ●=coating material D1, ◇=coating material D2, ■=coating material D3, It is clearly evident from the flow curves shown in FIGS. 2A and 2B that the formulations based on the dispersion with 1% by weight of Aerosil® R 972 cause a marked structural viscosity. At low shear rates, this enables very good stabilization of pigments and inactive fillers. The formulation based on 1% by weight of Borchi Gel also causes a relatively high viscosity, but this decreases only slightly at higher shear. However, a low viscosity is preferable in the course of dipping, rolling, spraying, in order to reach all regions of the surface to be treated.

By virtue of high viscosities at low shear rates, it is also possible to achieve a thicker layer without the material running off/dripping off again.

In contrast, the formulation based on 1% by weight of Aerosil® R 972 powder does not have this behaviour.

The yield curves shown in FIGS. 3A and 3B are intended to show how rapidly the viscosity determined by the flow curves is reestablished in the case of rapid change in the shear rate. In the case of ideal structural viscosity, the viscosity, as soon as the shear rate falls, should rise again and have a constant value.

The somewhat retarded buildup in the viscosity is desired, since it helps to achieve better flow of the coating material/paint.

It can be discerned from the yield curves that there is a rapid viscosity increase again for the formulation based on a dispersion with 1% by weight of Aerosil® R 972.

The invention claimed is:

1. An aqueous dispersion which comprises hydrophobized silicon dioxide particles, at least one polyol having 2 to 15 carbon atoms, at least one dispersing additive, a basic composition, and no color pigments, no inactive fillers, and no binders, wherein:
   the hydrophobized silicon dioxide particles have a methanol wettability of 30 to 60 and are present in the dispersion with a proportion of 0.1 to 50% by weight based on the dispersion;
   a proportion of water is 30 to 90% by weight based on the dispersion;
   the dispersing additive is at least one phosphate ester of an ethoxylated alcohol having 8 to 18 carbon atoms, a proportion of which is 3 to 25% by weight based on the proportion of the hydrophobized silicon dioxide particles;
   the basic composition comprises at least one amine of formulas $RNH_2$, $R_2NH$, and/or $R_3N$ wherein R is an alkyl group or a hydroxyl-substituted alkyl group having in each case 2 to 10 carbon atoms, and is present with a proportion of 5 to 30% by weight based on the proportion of hydrophobized silicon dioxide particles;
   the at least one polyol is present with a proportion of 1 to 10% by weight based on the proportion of hydrophobized silicon dioxide particles;
   the phosphate ester, the basic composition, and the at least one polyol are soluble in an aqueous phase of the dispersion; and
   the pH of the dispersion is 9 to 11.

2. The aqueous dispersion according to claim 1, wherein the methanol wettability is 35 to 55.

3. The aqueous dispersion according to claim 1, wherein the hydrophobized silicon dioxide particles are obtained by a fuming process.

4. The aqueous dispersion according to claim 1, the wherein a mean particle size (median) of the hydrophobized silicon dioxide particles is 200 nm or less.

5. The aqueous dispersion according to claim 1, wherein the phosphate ester is a mono-, di-, and/or trisubstituted phosphate ester of an ethoxylated primary alcohol with one, two, or three linear $C_{12}$-$C_{14}$ carbon chains.

6. The aqueous dispersion according to claim 1, comprising N,N-dimethylethanolamine.

7. The aqueous dispersion according to claim 1, comprising at least one selected from the group consisting of tripropylene glycol and 2,4,7,9-tetramethyldec-5-yne-4,7-diol.

8. The aqueous dispersion according to claim 1, comprising N-methyl-2-pyrrolidone.

9. The aqueous dispersion according to claim 1, further comprising at least one defoamer.

10. The aqueous dispersion according to claim 1, having a pH of 9 to 11, and comprising:
   10 to 30% by weight, based on the dispersion, of hydrophobic silicon dioxide particles, with a methanol wettability of 40 to 50, and a BET surface area of 90 to 150 $m^2/g$;
   9 to 16% by weight, based on the proportion of hydrophobized silicon dioxide particles, of a mono-, di-, and/or trisubstituted phosphate ester of an ethoxylated primary alcohol having one, two or three linear $C_{12}$-$C_{14}$ carbon chains;

5 to 20% by weight, based on the proportion of hydrophobized silicon dioxide particles, of N,N-dimethylethanolamine;

10 to 20% by weight, based on the proportion of hydrophobized silicon dioxide particles, of 1 methyl-2-pyrrolidone;

3 to 7% by weight of tripropylene glycol and 0.5 to 1.5% by weight of 2,4,7,9-tetramethyldec-5-yne-4,7-diol, based in each case on the proportion of hydrophobized silicon dioxide particles;

1 to 3% by weight, based on the proportion of hydrophobized silicon dioxide particles, of one or more defoamers; and 40 to 70% by weight of water, based on the dispersion.

11. A formulation which comprises hydrophobized silicon dioxide particles, at least one binder, at least one dispersing additive, at least one polyol having 2 to 15 carbon atoms, and a basic composition, wherein:

the hydrophobized silicon dioxide particles have a methanol wettability of 30 to 60 and are present in the formulation with a proportion of 0.05 to 5% by weight based on the formulation;

the dispersing additive is at least one phosphate ester of an ethoxylated alcohol having 8 to 18 carbon atoms, a proportion of which is 3 to 25% by weight based on the proportion of the hydrophobized silicon dioxide particles;

the basic composition comprises at least one amine of formulas $RNH_2$, $R_2NH$, and/or $R_3N$, where R is an alkyl group or a hydroxyl-substituted alkyl group having in each case 2 to 10 carbon atoms, and is present with a proportion of 5 to 30% by weight based on the proportion of hydrophobized silicon dioxide particles;

the at least one polyols is present with a proportion of 1 to 10% by weight based on the proportion of hydrophobized silicon dioxide particles; and the pH of the formulation is less than 9.

12. The formulation according to claim 11, further comprising color pigments and/or inactive fillers.

13. A process for preparing a formulation, comprising adding the aqueous dispersion according to claim 1 to a binder, color pigment, and/or inactive filler.

14. A process of manufacturing a coating composition, comprising adding the aqueous dispersion according to claim 1 to a coating base composition.

15. An aqueous dispersion which comprises hydrophobized silicon dioxide particles, at least one polyol having 2 to 15 carbon atoms, at least one dispersing additive, a basic composition, and no color pigments, no inactive fillers, and no binders, wherein:

the hydrophobized silicon dioxide particles have a methanol wettability of 30 to 60 and are present in the dispersion with a proportion of 0.1 to 50% by weight based on the dispersion;

a proportion of water is 30 to 90% by weight based on the dispersion;

the dispersing additive is at least one phosphate ester of an ethoxylated alcohol having 8 to 18 carbon atoms, a proportion of which is 3 to 25% by weight based on the proportion of the hydrophobized silicon dioxide particles;

the basic composition consists of at least one amine of formulas $RNH_2$, $R_2NH$, and/or $R_3N$ wherein R is an alkyl group or a hydroxyl-substituted alkyl group having in each case 2 to 10 carbon atoms, and is present with a proportion of 5 to 30% by weight based on the proportion of hydrophobized silicon dioxide particles;

the at least one polyol is present with a proportion of 1 to 10% by weight based on the proportion of hydrophobized silicon dioxide particles;

the phosphate ester, the basic composition, and the at least one polyol are soluble in an aqueous phase of the dispersion; and the pH of the dispersion is 9 to 11.

* * * * *